(12) United States Patent
Dureault et al.

(10) Patent No.: US 10,189,744 B2
(45) Date of Patent: Jan. 29, 2019

(54) USE OF AN EPOXIDE-AMINE-BASED MULTICOMPONENT MORTAR COMPOSITION

(71) Applicant: Hilti Aktiengesellschaft, Schaan (LI)

(72) Inventors: Alex Dureault, Leymen (FR); Stephen Jewitt, Basel (CH); Christian Kloninger, Wessling (DE)

(73) Assignee: Hilti Aktiengesellschaft, Schaan (LI)

( * ) Notice: Subject to any disclaimer, the term of this patent is extended or adjusted under 35 U.S.C. 154(b) by 108 days.

(21) Appl. No.: 14/905,664

(22) PCT Filed: Jul. 18, 2014

(86) PCT No.: PCT/EP2014/065481
§ 371 (c)(1),
(2) Date: Jan. 15, 2016

(87) PCT Pub. No.: WO2015/007879
PCT Pub. Date: Jan. 22, 2015

(65) Prior Publication Data
US 2016/0159690 A1   Jun. 9, 2016

(30) Foreign Application Priority Data
Jul. 18, 2013   (EP) ..................................... 13177037

(51) Int. Cl.
*C08G 59/18*   (2006.01)
*C04B 24/12*   (2006.01)
(Continued)

(52) U.S. Cl.
CPC .......... *C04B 24/302* (2013.01); *C04B 24/121* (2013.01); *C04B 26/14* (2013.01);
(Continued)

(58) Field of Classification Search
CPC ................................. C04B 24/00; C08G 59/18
(Continued)

(56) References Cited

U.S. PATENT DOCUMENTS

| 4,866,133 A | 9/1989 | Andrews et al. |
| 6,214,159 B1 | 4/2001 | Armin et al. |

(Continued)

FOREIGN PATENT DOCUMENTS

| DE | 198 32 669 A1 | 1/2000 |
| DE | 10 2004 008 464 A1 | 9/2005 |

(Continued)

OTHER PUBLICATIONS

International Search Report (PCT/ISA/210) issued in PCT Application No. PCT/EP2014/064676 dated Sep. 10, 2014 with English-language translation (six (6) pages).

(Continued)

*Primary Examiner* — Duc Truong
(74) *Attorney, Agent, or Firm* — Crowell & Moring LLP

(57) ABSTRACT

Described is the use of a hardening composition for epoxide-amine-based, multicomponent mortar compositions, particularly the use of one of these epoxide-amine-based, multicomponent mortar compositions for chemical fastening purposes. The multicomponent mortar composition contains (A) a resin component, which comprises as a curable compound at least an epoxide resin and optionally at least one reactive diluent, and (B) a hardener component, which comprises a hybrid hardener, wherein the resin component (A) and/or the hardener component (B) optionally comprises other ingredients selected from among inorganic and/or organic compounds. The hybrid hardener is a mixture of (a) at least one amine, selected from among aliphatic, alicyclic, or aromatic amines, as a hardener, and (b) a novolac resin as catalyst, wherein the novolac resin is contained in a quantity (Continued)

of 30 to 45 percent by weight, relative to the total weight of the hybrid hardener. The use of the hybrid hardener results in a rapid curding of the multicomponent mortar composition, even at low temperatures, with a complete through-curing of the mortar composition. High load values of the cured mortar composition both at low temperatures (+5° C.) and at high temperatures (+50° C.) and improved creep resistance at high temperatures (+50° C.) are hereby achieved. In addition, one can entirely omit the use of free phenols.

8 Claims, 1 Drawing Sheet

(51) Int. Cl.
    *C04B 26/14*      (2006.01)
    *C04B 24/30*      (2006.01)
    *C04B 28/06*      (2006.01)
    *C04B 40/00*      (2006.01)
    *C04B 40/06*      (2006.01)
    *C08G 59/40*      (2006.01)
    *C08G 59/56*      (2006.01)
    *C08G 59/62*      (2006.01)
    *C04B 103/10*      (2006.01)

(52) U.S. Cl.
    CPC .......... *C04B 28/06* (2013.01); *C04B 40/0039* (2013.01); *C04B 40/065* (2013.01); *C08G 59/40* (2013.01); *C08G 59/56* (2013.01); *C08G 59/621* (2013.01); *C04B 2103/10* (2013.01)

(58) Field of Classification Search
    USPC ......................................................... 528/87
    See application file for complete search history.

(56) References Cited

U.S. PATENT DOCUMENTS

| | | |
|---|---|---|
| 6,649,729 B1 | 11/2003 | Scherzer et al. |
| 2001/0035111 A1 | 11/2001 | Gienau et al. |
| 2004/0092656 A1 | 5/2004 | Vogel et al. |
| 2004/0092673 A1 | 5/2004 | Vogel et al. |
| 2005/0084682 A1 | 4/2005 | Gfeller et al. |
| 2007/0119745 A1 | 5/2007 | Vogel et al. |
| 2007/0264506 A1 | 11/2007 | Wigger |
| 2010/0210758 A1 | 8/2010 | Muller-Frischinger et al. |
| 2013/0000839 A1 | 1/2013 | Grun et al. |
| 2013/0112432 A1 | 5/2013 | Buergel |

FOREIGN PATENT DOCUMENTS

| | | |
|---|---|---|
| EP | 0 365 479 A | 4/1990 |
| EP | 0 974 610 A2 | 1/2000 |
| EP | 1 475 412 A1 | 11/2004 |
| EP | 1 674 495 A1 | 6/2006 |
| EP | 2 518 033 A2 | 10/2012 |
| JP | 2001-164224 A | 6/2001 |
| JP | 2001-240653 A | 9/2001 |
| JP | 2001-525469 A | 12/2001 |
| JP | 2008-525553 A | 7/2008 |
| RU | 2 294 351 C2 | 2/2007 |
| SU | 681078 A1 | 8/1979 |
| WO | WO 95/26997 A1 | 10/1995 |
| WO | WO 99/29757 A1 | 6/1999 |
| WO | WO 02/079293 A1 | 10/2002 |
| WO | WO 02/079341 A1 | 10/2002 |
| WO | WO 2011/113533 A1 | 9/2011 |

OTHER PUBLICATIONS

German-language Written Opinion (PCT/ISA/237) issued in PCT Application No. PCT/EP2014/065481 dated Sep. 10, 2014 (eight (8) pages).
International Search Report (PCT/ISA/210) issued in PCT Application No. PCT/EP2014/065481 dated Oct. 21, 2014 with English-language translation (six (6) pages).
German-language Written Opinion (PCT/ISA/237) issued in PCT Application No. PCT/EP2014/065481 dated Oct. 21, 2014 (eight (8) pages).
Russian-language Search Report issued in counterpart Russian Application No. 2016105299/04(008583) dated Dec. 11, 2017 (two pages).
Russian-language Office Action issued in counterpart Russian Application No. 2016105299/04(008583) dated Dec. 18, 2017 (five pages).
Written Opinion issued in counterpart Singaporean Application No. 11201600309R dated Jan. 19, 2018 (Four (4) pages).
Japanese-language Office Action issued in counterpart Japanese Application No. 2016-526654 dated Jan. 31, 2018 (Four (4) pages).

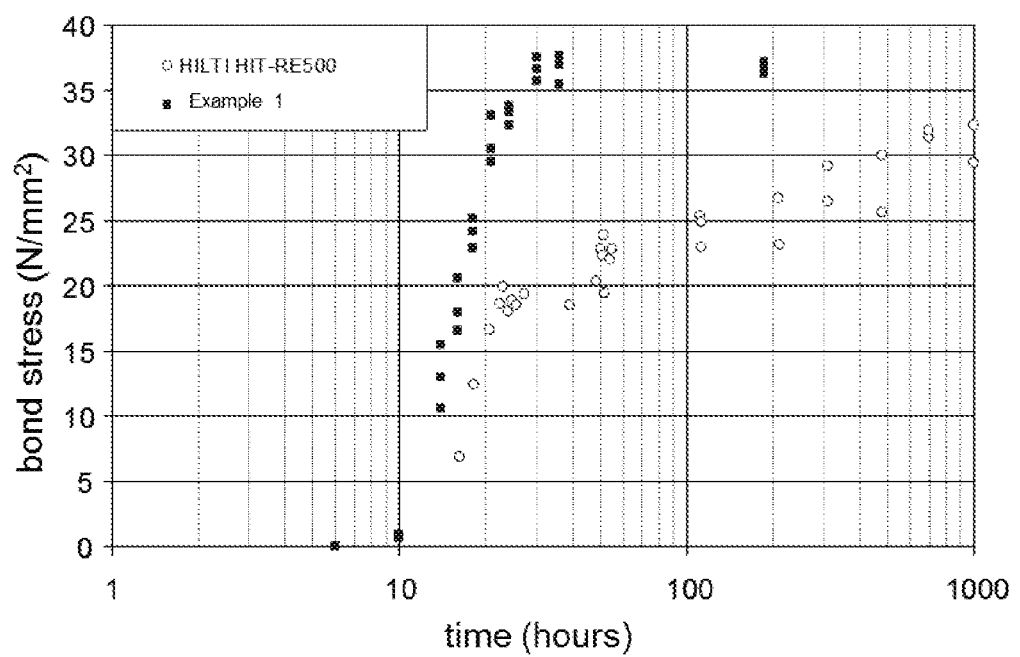

USE OF AN EPOXIDE-AMINE-BASED MULTICOMPONENT MORTAR COMPOSITION

The present invention relates to the use of a hybrid hardener as a hardener in epoxide-amine-based, multicomponent mortar compositions and the use of a multicomponent, epoxide-amine-based mortar composition produced utilizing the hybrid hardener for construction purposes, except for coatings.

Organic, curable two-component mortar compositions based on curable epoxide resins and amine hardeners have been known for a long time and are used as adhesives, spackling compositions for filling cracks, and among other things for attaching construction elements, such as anchor rods, reinforced concrete (reinforcement bars), screws, and similar, in drilled holes of various substrates. In using such chemical anchors, particularly at outdoor construction sites, problems occur because the mortar composition must on the one hand be easy to handle even at low temperatures, and on the other, it must exhibit very little creep at elevated temperatures, but simultaneously have a long processing time and it must cure quickly and completely in a broad temperature range while achieving high load values, even for damp drilled holes and low temperatures, and have good dimensional stability under heat of the cured composition. These partially contradictory property profiles are not easily fulfilled. In order to achieve good handling properties at low temperatures, it is therefore common with conventional mortar compositions to provide a high content of low-viscosity ingredients, a small quantity of filler materials, and coarse filler materials, which however is a disadvantage for low creep behavior under load at elevated temperatures. Alternatively, a long processing time is achieved by means of a high content in non-reactive or non-crosslinking diluents and few reactive components, which impedes a short through-curing time.

Special epoxide-amine-based mortar compositions have slow curing kinetics, an extended working life or gel period, as well as typically low heat resistance and creep strength. This results in their being easy to use and achieving good load-bearing values only in a narrow temperature range.

Therefore, it was a major challenge in the last several years to improve the curing properties of the epoxide-amine systems, particularly to accelerate curing without impairing the superior effectiveness of the epoxide-amine systems.

A promising approach aimed at using Mannich bases as hardeners, which combine the curing components, the amine, and the acceleration components, the phenol, into one molecule. One was hereby able to achieve that the mortar compositions cure satisfactorily at low temperatures and provide sufficient load values after curing. For example, for the adhering of large components or exterior applications in building construction and civil engineering, EP 1 475 412 A2 describes an application range of +5° C. to +60° C., and a glass transition temperature of +80° C. From DE 198 32 669 A1, a two-component mortar composition is known that, even at temperatures below 0° C., exhibits an increased curing rate and simultaneously an improved through-curing and an improved flow behavior. A multicomponent mortar composition with significantly elevated bond stress after curing, even at higher temperatures, such as at +80° C., and with satisfactory curing at −5° C., is described in DE 10 2004 008 464 A1.

It has been shown that despite the rapid reaction that Mannich bases undergo with epoxide resins compared to other amine hardeners, their use in the field of chemical fastening technology is limited. For example, one will quite often see at low temperatures (<10° C.) a "freezing" of the reaction starting at a certain rate limit. Beyond this rate limit, curing is diffusion-controlled and occurs only very slowly or not at all. The consequence is that typical curing times of such systems at +5° C. lie in a range of at least 72 hours. Due to the incomplete reaction at low temperatures, i.e., the composition does not cure entirely, the technical application area of the chemical anchor is limited, since the reliable loads must be reduced or a high load can only be achieved after a long curing time.

Another disadvantage of known epoxide-amine-based, multicomponent mortar compositions lies in the use of often substantial quantities of corrosive amines as hardeners, such as m-xylylenediamine (mXDA), and/or aromatic alcohol compounds, such as free phenols, e.g., bisphenol A, which can mean a health risk for users. These compounds are sometimes contained in quite substantial quantities, i.e., up to 50% in the respective components of multicomponent mortar compositions, so that often the package must be mandatorily labeled, which leads to a lower user acceptance of the product. In the last several years, many countries instituted limits up to which for example mXDA or bisphenol A content requires labeling on the products, or may even still be contained in products.

For epoxide-based coating systems, it has been shown that by adding a novolac resin as a catalyst or by using a hybrid hardener based on a mixture of amines and novolac resins, it is possible to significantly increase the curing rate of epoxide resin compositions at low temperatures, i.e., in the range of near 0° C., as described in WO 99/29757 (novolac-based catalyst) and EP 1 674 495 A1 (hybrid hardener), for protective coatings for metallic and mineral substrates. However, an application of these hybrid hardeners, particularly in the field of chemical fastening technology, e.g., for the chemical anchoring of fastening elements such as anchor rods, reinforcing bars and similar, particularly for two-component injection systems, is not yet known.

The object of the invention consists of providing a multicomponent mortar composition in which the content of compounds requiring labeling is reduced to the greatest extent possible without having to forego the advantageous properties of the compounds requiring labeling.

Another object of the present invention consists of making the hybrid hardeners, successfully applied in coatings, usable for additional construction purposes, particularly chemical fastening technology.

Surprisingly, it was found that the use of a hybrid hardener, which is a mixture of amines and a novolac resin, as a hardener in multicomponent mortar compositions leads to significantly improved properties of the mortar composition, and in addition allows a much lower content of compounds requiring labeling, such as free phenol or its derivatives, such as bisphenol A, and mXDA.

In comparison to the hardeners used to date on the basis of Mannich base formulations, the use of the hybrid hardener results in a rapid curing of epoxide-amine-based, multicomponent mortar compositions, even at low temperatures (+5° C.), with a complete curing of the mortar composition. Both at low temperatures as well as at high temperatures (+50° C.), high load values of the cured mortar composition and an improved creep resistance at high temperatures (+50° C.) are hereby achieved, which is to be attributed to the complete through-curing of the mortar composition. The relatively quick through-curing of the mortar composition obtained by using the novolac-amine hybrid hardener according to the invention was surprising, compared to known mortar compositions with a Mannich base as a hardener.

An additional advantage of the invention is that one can entirely omit the use of free phenols, which are commonly added to Mannich base-cured systems as a catalyst, whereby the multicomponent mortar composition contains fewer harmful ingredients.

As mentioned in the beginning, multicomponent mortar compositions are complex systems, wherein it is not possible to predict the influence of the inorganic aggregates as well as properties, such as curing, through-curing, adhesion to various substrates and ambient conditions, load values, creep resistance and similar. The effect achievable with the catalyst described in DE 197 54 393.6 A1 and the hybrid hardeners described in EP 04 106 911 A1 was not foreseeable since the influence of the hybrid hardener on the high requirements placed on the properties of the mortar composition, both in an uncured and a cured state, necessary for construction purposes, particularly chemical fastening purposes, was neither known nor empirically calculable. In addition, different requirements are placed on the properties of coating systems than on mortar compositions for construction purposes, particularly the chemical anchoring of fastening elements in drilled holes. Therefore, the results are difficult to apply to the systems of the present invention.

Therefore, a subject matter of the invention is the use of a hybrid hardener as a hardener for multicomponent mortar compositions, particularly epoxide-amine-based, multicomponent mortar compositions. The hybrid hardener is a mixture of (a) at least one amine, selected from among aliphatic, alicyclic, or aromatic amines, wherein the amine averages at least two reactive hydrogen atoms, bonded to a nitrogen atom, per molecule, as a hardener, and (b) at least one novolac resin having the general formula (I):

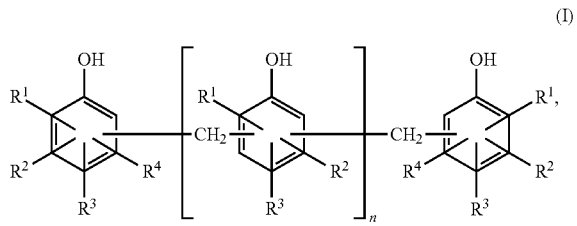

in which $R^1$, $R^2$, $R^3$ and $R^4$, each independent of each other, are hydrogen or an unbranched or branched $C_1$-$C_{15}$ alkyl radical and n is 1 to 12, as a catalyst.

Preferred novolac resins are those in which $R^1$, $R^2$, $R^3$ and $R^4$ in formula (I) are either hydrogen, or in which one or two of the radicals $R^1$ to $R^4$ is/are the radical $CH_3$, or in which one of the radicals $R^1$ to $R^4$ is the tert-butyl radical or an unbranched or branched $C_1$-$C_{15}$ alkyl radical.

In this context, reference is made to the application WO 99/29757 A1, whose content is hereby included in this application.

According to the invention, the novolac resin is used in a quantity of 10 to 45 percent by weight, preferably 20 to 45 percent by weight, more preferably 30 to 45 percent by weight, and most preferably 30 to 40 percent by weight, relative to the hybrid hardener. The quantity shall not exceed 45 percent by weight in order to retain at room temperature a liquid hardener composition, which is also sufficiently low-viscosity at low temperatures, to not negatively influence the extraction properties of the curing components of the mortar composition. At a quantity of less than 10 percent by weight, the accelerating effect decreases to such an extent that an acceleration is hardly observed anymore and the positive effect of the hybrid hardener no longer has an influence on the acceleration of the curing reaction at temperatures below +10° C.

Since the phenolic groups in the novolac resin used according to the invention are present in a high-molecular form, one can entirely omit using free phenols without having to forego the effect(s) of the phenols, such as accelerating the curing of epoxide compounds using amines.

The amines, which are typical for epoxide-amine systems and known to a person skilled in the art and selected from among aliphatic, alicyclic, and aromatic amines, are suited as hardeners, wherein the amine has on average at least two reactive hydrogen atoms, bonded to a nitrogen atom, per molecule. Included in these are also polyamines with at least two amino groups in the molecule.

Within the meaning of the invention: "aliphatic compounds" refer to acyclic or cyclic, saturated or unsaturated carbon compounds, except aromatic compounds; "alicyclic compounds" refer to compounds having a carbocyclic ring structure, except benzoyl derivatives or other aromatic systems; and "aromatic compounds" refer to compounds following the Hückel (4n+2) rule; and "amines" refer to compounds that are derived by exchanging one, two, or three hydrogen atoms with hydrocarbon groups of ammonia and have the general structures $RNH_2$ (primary amines), $R_2NH$ (secondary amines) and $R_3N$ (tertiary amines) (IUPAC. Compendium of Chemical Terminology, 2nd ed. (the "Gold Book"). Compiled by A. D. McNaught and A. Wilkinson. Blackwell Scientific Publications, Oxford (1997)).

Suitable amines, without limiting the scope of the invention, include for example: 1,2-diaminoethane(ethylenediamine), 1,2-propanediamine, 1,3-propanediamine, 1,4-diaminobutane, 2,2-dimethyl-1,3-propanediamine(neopentane diamine), diethylaminopropylamine (DEAPA), 2-methyl-1,5-diaminopentane, 1,3-diaminopentane, 2,2,4- or 2,4,4-trimethyl-1,6-diaminohexane and mixtures thereof (TMD), 1-amino-3-aminomethyl-3,5,5-trimethylcyclohexane, 1,3-bis(aminomethyl)-cyclohexane, 1,2-bis(aminomethyl)cyclohexane, hexamethylenediamine (HMD), 1,2- and 1,4-diaminocyclohexane (1,2-DACH and 1,4-DACH), bis(4-aminocyclohexyp)methane, bis(4-amino-3-methylcyclohexyl)methane, diethylenetriamine (DETA), 4-azaheptane-1,7-diamine, 1,11-diamino-3,6,9-trioxundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis-(3-aminopropyl)methylamine, triethylenetetramine (TETA), tetraethylenepentamine (TEPA), pentaethylenehexamine (PEHA), bis(4-amino-3-methylcyclohexyl)methane, 1,3-benzenedimethanamine (m-xylenediamine, mXDA), 1,4-benzenedimethanamine (p-xylenediamine, pXDA), 5-(aminomethyl)bicyclo[[2,2,1] hept-2-yl]methylamine (NBDA, norbornandiamine), dimethyldipropylenetriamine, dimethylaminopropyl-aminopropylamine (DMAPAPA), 3-aminomethyl-3,5,5-trimethylcyclohexylamine(isophorondiamine (IPD)), diaminodicyclohexylmethane (PACM), mixed polycyclic amines (MPCA) (e.g., Ancamine® 2168), dimethyldiaminodicyclohexylmethane (Laromin® C260), 2,2-bis(4-aminocyclohexyl)propane, and (3(4),8(9)bis(aminomethyl)dicyclo[5,2,1,0$^{2,6}$]decane (isomer mixture, tricyclic primary amines; TCD-diamine).

According to the invention, preferred are polyamines, such as 2-methylpentandiamine (DYTEK A®), 1-amino-3-aminomethyl-3,5,5-trimethylcyclohexane (IPD), 1,3-benzenedimethanamine (m-xylylenediamine, mXDA), 1,4-benzenedimethanamine (p-xylylenediamine, PXDA), 1,6-diamino-2,2,4-trimethylhexane (TMD), diethylenetriamine (DETA), triethylenetetramine (TETA) tetraethylenepentamine (TEPA), pentaethylenehexamine (PEHA), N-ethylaminopiperazine (N-EAP), 1,3-bisaminomethylcyclohexane (1,3-BAC), (3(4),8(9)bis(aminomethyl)dicyclo[5,2,1,0$^{2,6}$] decane (isomer mixture, tricyclic primary amines; TCD-diamine), 1,14-diamino-4,11-dioxa-tetradecane, dipropylenetriamine, 2-methyl-1,5-pentanediamine, N,N'-dicyclohexyl-1,6-hexanediamine, N,N'-dimethyl-1,3-diaminopropane, N,N'-diethyl-1,3-diaminopropane, N,N-dimethyl-1,3-diaminopropane, secondary polyoxypropylene di- and triamines, 2,5-diamino-2,5-dimethylhexane, bis-(aminomethyl)tricyclopentadiene, 1,8-diamino-p-menthane, bis-(4-amino-3,5-dimethylcyclohexyl)methane, 1,3-bis (aminomethyl)cyclohexane (1,3-BAC), dipentylamine, N-2-(aminoethyl)piperazine (N-AEP), N-3-(aminopropyl)piperazine, and piperazine.

In this context, reference is made to application EP 1 674 495 A1, whose content is hereby included in this application.

The amine can either be used alone or as a mixture of two or more of them, wherein a mixture of two or more of them is preferred. This enables one to forego using toxic 1,3-benzenedimethanamine to the greatest extent possible, or to limit its use substantially, without foregoing its advantageous properties in regard to reactivity and viscosity behavior.

An amine mixture has proven itself advantageous in terms of the simultaneous control over curing speed, load values on various concrete substrates, dimensional stability under heat, and viscosity of the hardener mixture. The viscosity has a direct influence on the extraction forces of the mortar composition. The mixture is composed according to the invention of two or more amines, selected from among unbranched or branched $C_2$-$C_{10}$ alkyl diamines, $C_2$-$C_{10}$ polyalkylene-polyamines and aromatic amines, which preferably contain a substituted or unsubstituted benzene ring.

The alkyldiamines are preferably selected from among 2,2,4- or 2,4,4-trimethyl-1,6-diaminohexane and mixtures thereof (TMD), 1-amino-3-aminomethyl-3,5,5-trimethylcyclohexane (IPDA), 1,3-bis(aminomethyl)-cyclohexane (1,3-BAC), 1,4-bis(aminomethyl)-cyclohexane (1,4-BAC), 2-methyl-1,5-pentandiamine (DYTEK A), (3(4),8(9)bis (aminomethyl)dicyclo[5,2,1,0$^{2,6}$]decane and isomer mixtures thereof (TCD-diamine), aminomethyltricyclo[5,2,1, 0$^{2,6}$]decane and isomer mixtures thereof (TCD-amine) and 1,6-hexamethylenediamine.

The polyalkylene-polyamines are preferably selected from among diethylenetriamine (DETA), triethylenetetramine (TETA), tetraethylenepentamine (TEPA) and pentaethylenehexamine (PEHA).

The aromatic amines are preferably selected from among 1,3-benzenedimethanamine (mXDA) and 1,4-benzenedimethanamine (pXDA) and N,N'-dimethyl-1,3-benzenedimethanamine.

The mixture can also consist in each case of two or more amines, selected from among the same group or from different groups. A mixture of two amines can thus be composed of two aliphatic amines, two alicyclic amines, or two aromatic amines. Preferred amine mixtures are mixtures from the different amino groups, e.g., mixtures of at least one dialkyldiamine and at least one aromatic amine or at least one polyalkyl-polyamine or mixtures of at least one polyalkyl-polyamine and at least one aromatic amine or mixtures of at least one dialkyldiamine, at least one polyalkyl-polyamine and at least one aromatic amine.

A particularly preferred mixture of two amines is a mixture of 2-methyl-1,5-pentanediamine and 1,3-benzenedimethanamine, wherein most particularly preferred is a mixture of 28 to 34 percent by weight of 2-methyl-1,5-pentanediamine and 4 to 7 percent by weight of 1,3-benzenedimethanamine, each relative to the hybrid hardener.

An alternative, particularly preferred mixture of four amines is a mixture of trimethylhexamethylenediamine (TMD), 2-methylpentanediamine (DYTEK A), triethylenetetramine (TETA) and 1,3-benzenedimethanamine (mXDA), where most particularly preferred is a mixture of 20 to 28 percent by weight of trimethylhexamethylenediamine (TMD), 20 to 28 percent by weight of 2-methylpentanediamine (DYTEK A), 10 to 18 percent by weight of triethylenetetramine (TETA) and 4 to 10 percent by weight of 1,3-benzenedimethanamine (mXDA), each relative to the hybrid hardener.

By means of these mixtures, the content of toxic 1,3-benzenedimethanamine (mXDA) can be kept as low as possible (<10 percent by weight) and in addition, corresponding combinations enable one to adjust the curing speed, the load values to various concrete substrates, dimensional stability under heat, and the total viscosity.

In a particularly preferred embodiment of the invention, the hybrid hardener also contains an aminophenol or an ether thereof, which has at least one tertiary amino group optionally together with a primary and/or secondary amino group, as a co-catalyst. The co-catalyst is selected from among compounds having the general formula (II),

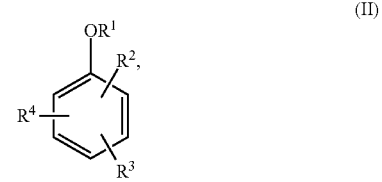

(II)

in which $R^1$ is hydrogen or an unbranched or branched $C_1$-$C_{15}$ alkyl radical, $R^2$ is a $(CH_2)_n NR^5 R^6$ radical or a $NH(CH_2)_n NR^5 R^6$ radical, in which $R^5$ and $R^6$ independently of each other are an unbranched or branched $C_1$-$C_{15}$ alkyl radical and n is 0 or 1, $R^3$ and $R^4$ independently of each other are hydrogen or a $(CH_2)_n NR^7 R^8$ radical or a $NH(CH_2)_n NR^7 R^8$ radical, and $R^7$ and $R^8$ independently of each other are an unbranched or branched $C_1$-$C_{15}$ alkyl radical and n is 0 or 1.

Preferably, $R^1$ is hydrogen or a $C_1$-$C_{15}$ alkyl radical, particularly an unbranched an unbranched $C_1$-$C_{15}$ alkyl radical, more preferably methyl or ethyl, and most preferably methyl.

Preferably, the phenol having the formula (II) is substituted in the 2-, 4-, and 6-position, i.e., the substituents $R^2$, $R^3$ and $R^4$ are in the 2-, 4- and 6-position.

In the event that $R^5$, $R^6$, $R^7$ and $R^8$ are alkyl radicals, these are preferably a $C_1$-$C_{15}$ alkyl radical, more preferably a methyl or ethyl radical, and most preferably the methyl radical.

As co-catalysts, one can use either a compound or a mixture of at least two compounds having the formula (II).

Preferred is the co-catalyst selected from among 2,4,6-tris(dimethylaminomethyl)phenol, bis(dimethylaminomethyl)phenol and 2,4,6-tris(dimethylamino)phenol. Most preferred is the co-catalyst 2,4,6-tris(dimethylaminomethyl)phenol.

A preferred co-catalyst mixture according to the invention contains 2,4,6-tris(dimethylaminomethyl)phenol and bis(dimethylaminomethyl)phenol. Such mixtures are commercially available as Ancamine® K54 (AirProducts, Belgium), for example.

The tertiary amine is used according to the invention in a quantity of 0.5 to 10 percent by weight, relative to the hybrid hardener.

The ratio of amine or amine mixture to the novolac resin is 70:30 to 55:45 according to the invention, wherein the content of novolac resin and amine or the amine mixture must be selected in such a manner that the hybrid hardener remains liquid. For example, for the amine mixture of trimethylhexamethylenediamine and 1,3-benzenedimethanamine, the best ratio of amine to novolac resin is 60:40.

Another subject matter of the invention is the use of a multicomponent mortar composition, particularly a two-component mortar composition with (A) a resin component that comprises as a curable compound at least one epoxide resin, which contains on average more than one epoxide group per molecule, and optionally at least one reactive diluent; and (B) a hardener component that comprises a hybrid hardener, wherein the resin components (A) and/or the hardener components (B) optionally comprise additional components selected from among inorganic and/or organic compounds, for construction purposes, except coatings.

The hybrid hardener contains according to the invention a mixture of (a) at least one amine, selected from among aliphatic, alicyclic, or aromatic amines, wherein the amine has on average at least two reactive hydrogen atoms, bonded to a nitrogen atom, per molecule, as a hardener, and (b) a novolac resin of the general formula (I):

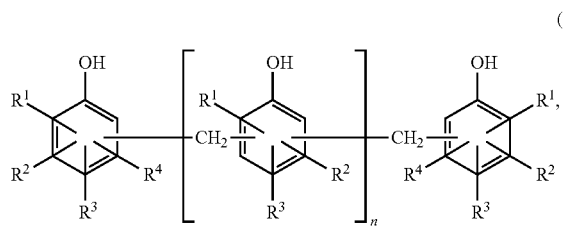

in which $R^1$, $R^2$, $R^3$ and $R^4$ are, each independent of the other, hydrogen or an unbranched or branched $C_1$-$C_{15}$ alkyl radical and n is 1 to 12, wherein the novolac resin in a quantity of 30 to 45 percent by weight relative to the total weight of the hybrid hardener, as a catalyst.

Within the meaning of the present invention, the term "for construction purposes" comprises: the structural adhesive bonding of concrete/concrete, steel/concrete, or steel/steel or one of the mentioned materials on other mineral materials; the structural reinforcement of building components made of concrete, masonry, and other mineral materials; the reinforcement applications using fiber-reinforced polymers for buildings; the chemical fastening on surfaces made of concrete, steel or other mineral materials, particularly the chemical fastening of structural elements and anchoring means, such as anchor rods, anchor bolts, (threaded) rods, (threaded) sleeves, reinforced concrete, screws and similar, in drilled holes in various substrates, such as (reinforced) concrete, masonry, other mineral materials, metals (e.g., steel), ceramics, plastics, glass, and wood.

In a preferred embodiment of the invention, the multicomponent mortar composition, particularly a two-component mortar composition, also contains (c) at least a compound having the general formula (II):

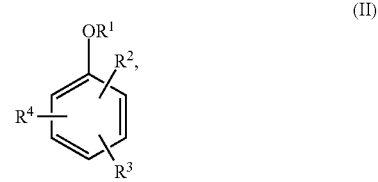

in which $R^1$ is hydrogen or an unbranched or branched $C_1$-$C_{15}$ alkyl radical, $R^2$ is a $(CH_2)_n NR^5 R^6$ radical or a $NH(CH_2)_n NR^5 R^6$ radical, in which $R^5$ and $R^6$ independent of each other are an unbranched or branched $C_1$-$C_{15}$ alkyl radical and n is 0 or 1, $R^3$ and $R^4$ independent of each other are hydrogen or a $(CH_2)_n NR^7 R^8$ radical or a $NH(CH_2)_n NR^7 R^8$ radical, and $R^7$ and $R^8$ independent of each other are an unbranched or branched $C_1$-$C_{15}$ alkyl radical and n is 0 or 1, as a co-catalyst. In this way, the glass transition temperature of the cured resin can be increased, which has a positive effect on the usability of the cured mortar composition at elevated temperatures since the achievable load values can be further increased.

In regard to the hybrid hardener and the co-catalyst, one shall refer to the explanations above.

The hardener is used according to the invention in a quantity of 54 to 84 percent by weight, relative to the hardener component.

As curable epoxides, one can consider a variety of commercially available compounds known for this purpose to a person skilled in the art, which on average contain more than one epoxide group, preferably two epoxide groups, per molecule. These epoxide compounds (epoxide resins) may thereby be both saturated as well as unsaturated, and aliphatic, alicyclic, aromatic or heterocyclic, and can also have hydroxyl groups. They may also contain those substituents which under mixing or reaction conditions do not cause any interfering side reactions, for example alkyl or aryl substituents, ether groups and similar. Within the scope of the invention, trimeric and tetrameric epoxides are also suited. Suitable polyepoxide compounds are described for example in Lee, Neville, Handbook of Epoxy Resins 1967. Preferably, the epoxides involve glycidyl ethers, which are derived from multivalent alcohols, particularly biphenols and novolacs. The epoxide resins have an epoxy equivalent weight of 120 to 2,000 g/EQ, preferably from 140 to 400. Mixtures of multiple epoxide resins may also be used. Particularly preferred are liquid diglycidyl ethers on the basis of bisphenol A and/or F with an epoxy equivalent weight of 180 to 190 g/EQ. Mixtures of multiple epoxide resins may also be used.

As multivalent phenols, one shall mention for example: resorcin, hydroquinone, 2,2-bis-(4-hydroxyphenyl)-propane (bisphenol A), isomeric mixtures of dihydroxyphenylmethane (bisphenol F), tetrabromobisphenol A, novolacs. 4,4'-dihydroxyphenylcyclohexane, 4,4'-dihydroxy-3,3'-dimethyldiphenylpropane and similar.

A diglycidyl ether of bisphenol A or of bisphenol F or a mixture thereof is preferred as the epoxide.

The epoxide resin content is >0 to 100 percent by weight, preferably 10 to 70 percent by weight, and particularly preferred 30 to 60 percent by weight, relative to the resin component (A).

Besides the epoxide resins, the multicomponent mortar composition can contain at least one reactive diluent. In a multicomponent system, the reactive diluent should not be present in the hardener component, but preferably only in the resin component (A). As reactive diluents, one uses glycidyl ethers of aliphatic, alicyclic, or aromatic mono- or particularly polyalcohols are used, such as monoglycidyl ether e.g., o-cresyl glycidyl ether, and/or particularly glycidyl ether with an epoxoid functionality of at least 2, such as 1,4-butane dioldiglycidyl ether (BDDGE), cyclohexanedimethanol diglycidyl ether, hexanediol diglycidyl ether and/or particularly tri- or higher glycidyl ethers, e.g., glycerol triglycidyl ether, pentaerythritol tetraglycidyl ether or trimethylolpropane triglycidyl ether (TMPTGE), or also mixtures of two or more of these reactive diluents preferably triglycidyl ether, particularly preferred as a mixture of 1,4-butanediol diglycidyl ether (BDDGE) and trimethylolpropane triglycidyl ether (TMPTGE). The reactive diluents are present in a quantity of 0 to 60 percent by weight, particularly from 1 to 20 percent by weight, relative to the resin component (A).

In one embodiment, the multicomponent mortar composition may also contain a bonding agent. By using a bonding agent, the cross-linkage of the drilled hole wall to the mortar composition is improved, so that the adhesion in a cured state improves. This is significant for using the two-component mortar composition, e.g., in diamond-bored drilled holes, and increases the load values. Suitable bonding agents are selected from the group of silanes, which are functionalized with additional reactive organic groups, such as 3-glycidoxypropyltrimethoxysilane, 3-glycidoxypropyltriethoxysilane, 2-(3,4-epoxycyclohexypethyltrimethoxysilane, N-2-(aminoethyl)-3-aminopropylmethyl-diethoxysilane, N-2-(aminoethyl)-3-aminopropyltriethoxysilane, 3-aminopropyltrimethoxysilane, 3-aminopropyltriethoxysilane, N-phenyl-3-aminoethyl-3-aminopropyltrimethoxysilane, 3-mercaptopropyltrimethoxysilane and 3-mercaptopropylmethyl-dimethoxysilane, wherein 3-aminopropyltriethoxysilane is preferred.

In this context, reference is made to WO 2011/113533 A1, whose content is hereby included in this application.

The bonding agent may be contained in a quantity of up to 10 percent by weight, preferably 0.1 to 5 percent by weight, relative to the resin component.

The resin component (A) and/or the hardener component (B) may also contain the conventionally used inorganic aggregates, such as fillers and/or additional inorganic additives.

As fillers, conventional fillers and/or reinforcing agents, preferably mineral or mineral-like fillers, are used, such as silicon dioxide, particularly pyrogenic silicon dioxide, quartz sand and/or quartz powder, glass beads, hollow glass beads, mica, cement, calcium carbonate and/or calcium sulfate, corundum, carbide, metal particles, barite, synthetic and/or natural fibers, and so on.

Additional conceivable additives are also thixotropic agents, such as if applicable organic post-treated pyrogenic silicic acid, bentonite, alkyl- and methyl cellulose, castor oil derivatives or similar, softeners, such as phthalic acid or sebacic acid esters, stabilizers, antistatic agents, thickening agents, flexibilizers, curing catalysts, rheology auxiliary agents, wetting agents, coloring additives, such as dyes or particularly pigments, for example for the differentiating dying of components to better control their mixing, as well as phlegmatising agents, dispersing agents, additional agents for controlling the rate of reaction, wetting agents and similar, mixtures of two or more of these, possible. Non-reactive diluents (solvents) may also be present, preferably in a quantity of up to 30 percent by weight, relative to the respective component (reaction resin mortar, hardener), for example from 1 to 20 percent by weight, such as lower alkyl ketone, e.g., acetone, di-lower alkyl-niederalkanoylamide, such as dimethylacetamide, lower alkylbenzenes, such as xylols or toluene, phthalic acid esters or paraffins.

In this regard, reference is made to the applications WO 02/079341 A1 and WO 02/079293 A1, whose content is hereby included in this application. The content of the fillers is 0 to 70 percent by weight, preferably 5 to 55 percent by weight, relative to the resin component (A) or curing component (B).

A preferred two-component mortar composition contains as a resin component 10-70 percent by weight epoxide resin, 1-20 percent by weight reactive diluents, and 1-75 percent by weight inorganic fillers, whereby the quantities are each relative to the resin component, and separate from that in a reaction-inhibiting manner as a hardener component 30-45 percent by weight novolac resin of formula (I), 54-84 percent by weight hardener, 0.1-10 percent by weight bonding agent, and 1-75 percent by weight inorganic fillers, wherein the quantities are each relative to the curing component. The sum of the components of the resin and curing components combined total 100% in each case.

The components of the two-component mortar composition are preferably contained in a two-chamber device. Accordingly, the resin components are packaged separately from the curing component, so that the one component regularly contains the curable epoxide resin and if applicable the reactive diluent, while the other component contains the amine hardener and the catalyst mixture. The fillers may be contained in the one or also in the other component, just as the other essentially known conventional ingredients.

The two-chamber systems, in which the curable two-component mortar composition is present, include in particular two or more foil pouches for separating curable ingredients and hardeners, wherein the content of the foil pouches may be jointly injected in a drilled hole, for example by means of a static mixer. These cartridges and foil pouch systems contain the hardener component separated in a reaction-inhibiting manner from the resin component. However, the packaging in multichamber cartridges or buckets or sets of buckets is also possible.

In the multicomponent mortar composition, particularly the two-component mortar composition, the ratio of the resin component to the curing component is 1:1 to 5:1, preferably 3:1.

It has been shown that the load values characterized by longer processing times and faster through-curing times can be achieved by the described multicomponent mortar, and specifically at temperatures of +5° C. to +50° C. common in fastening technology, and that it has high dimensional stability under heat.

The improvement is particularly evident in significantly improved adhesion on concrete substrates, particularly in diamond-bored drilled holes. In addition, the use of the novolac-amine hybrid hardener according to the invention enables one to achieve substantially faster curing at low temperatures compared to known systems.

The following systems serve to illustrate the invention, without limiting their scope:

EXEMPLARY EMBODIMENTS

Comparative Example V1

A commercial product, HIT RE 500 (packaging size 330/1), HILTI Aktiengesellschaft, Principality of Liechtenstein, on the basis of a preparation of epoxide resins and a Mannich base formulation as hardener and mineral fillers (Item no. 00305074, HILTI Deutschland GmbH, Kaufering, Germany) is compared to the same product in which the Mannich base hardener was replaced by a hybrid hardener.

Examples 1 to 4

According to the composition of the components listed below, mortar compositions are produced by mixing resin and hardener components at a volume ratio of 3:1 by means of a static mixer (HILTI MD 2500):

Resin Component (A)

| | |
|---|---|
| Reactive diluted epoxide resin [1]: | 61% |
| Bisphenol A base resin | |
| Bisphenol F base resin | |
| Trimethylolpropane triglycidyl ether | |
| 1,4-hexanediol diglycidyl ether | |
| Inorganic filler: | 38% |
| Quartz powder[2] | |
| Hydrophobized pyrogenic silicic acid | 3% |

[1] Total viscosity: 500 to 1200 mPa at 23° C.; epoxide equivalent weight 160-180 g/val
[2] Average grain size: 16 μm Hardener Component (B)

| | |
|---|---|
| Hardener: | 62% by wt. |
| Amine/novolac resin mixture[3] | |
| Inorganic filler: | |
| Cement[4] | 14% by wt. |
| Quartz powder[5] | 20% by wt. |
| Hydrophobized pyrogenic silicic acid | 4% by wt. |

[3] Viscosity at 23° C.: 150-300 mPa · s; amine value: 500-650 mg KOH
[4] Secar® 80, Kerneos Inc.
[5] Average grain size: 16 μm Amine/Novolac Resin Mixture The hybrid hardeners of Examples 1 to 4 according to the invention are composed of 22-28 percent by weight of novolac resin of formula (I), relative to the amine/novolac resin mixture, and the amines listed in the table below:

| | Example | | | |
|---|---|---|---|---|
| Amine | 1 | 2 | 3 | 4 |
| DYTEK A [6] | 20-28 wt.-%* | 40-56 wt.-% | 35-50 wt.-% | 20-28 wt.-% |
| TMD [7] | 20-28 wt.-%* | | | 20-28 wt.-% |
| TETA [8] | 10-20 wt.-%* | 8-19 wt.-% | 6-15 wt.-% | 10-20 wt.-% |
| mXDA [9] | 4-10 Gew.-%* | 5-12 wt.-% | 5-12 wt.-% | |
| IPD [10] | | | 5-12 wt.-% | |
| 1,3-BAC [11] | | | | 5-12 wt.-% |

*relative to the amine/novolac mixture
[6] 2-methyl-pentanediamine; INVISTA GmbH, Germany
[7] Trimethylhexamethylenediamine; Vestamin® TMD; Evonik Industries, Germany
[8] Triethylenetetramine; Huntsman, Belgium
[9] 1,3-benzenedimethanamine; Mitsubishi Gas Chemical Company INC., Japan
[10] 3-aminomethyl-3,5,5-trimethylcyclohexylamine; Vestamin® IPD; Evonik Industries, Germany
[11] 1,3-bis(aminomethyl)cyclohexane; Mitsubishi Gas Chemical Company INC., Japan a) Curing Process FIG. 1 depicts the comparison of the curing process of the formulation according to Example 1 and of HILTI RE 500 utilizing pull-out tests of M12×72 threaded rods in concrete after various periods at a subsurface temperature of +5° C. The steeper curve trend of the formulation according to the invention in direct comparison to HILTI RE 500 clearly shows that the formulation according to the invention cures faster and the curing is complete at a much earlier point in time.

b) Determining the Gel-time

The gel time of the mortar compositions is determined by means of a commercial device (GELNORM® gel timer) at a temperature of 25° C. To do so, the A and the B components are mixed at a volume ratio of 3:1 and tempered to 25° C. in a silicone bath directly after mixing and the temperature of the sample was measured. The sample itself is thereby in a test tube that is placed in an air jacket immersed in a silicone bath for tempering.

The heat development of the sample is recorded over time. The analysis is performed according to DIN16945. The gel time is the time at which a temperature increase by 10K is achieved, in this case from 25'C. to 35° C.

The results are listed in Table 1.

g) Determining the Load Values

To determine the load values of the cured mortar compositions, a threaded anchor rod HAS M12 is used, which is anchored in a drilled hole in concrete C20/25 having a diameter of 14 mm and a drilled hole depth of 72 mm using the two-component mortar composition according to the invention at +5° C. and +23° C. respectively. The average failure load is determined by the centric removal of the threaded anchor rod with tight support using high-strength threaded anchor rods. In each case, 3 threaded anchor rods are anchored and their load values are determined after 24 hours. The load values (bond stress) obtained hereby are listed as average values in Table 1 below.

TABLE 1

Gel time and bond stress of various mortar compositions

| | Example | | | | |
|---|---|---|---|---|---|
| | V1 | 1 | 2 | 3 | 4 |
| Gel time at 25° C. (min) * | 42.0 | 21.0 | 18.6 | 21.2 | 20.7 |
| Bond stress (MPa) after 24 h; HAS M12×72; Curing at 23° C. ** | 37.0 | 38.2 | 38.5 | 38.6 | 38.3 |

TABLE 1-continued

Gel time and bond stress of various mortar compositions

|  | Example | | | | |
|---|---|---|---|---|---|
|  | V1 | 1 | 2 | 3 | 4 |
| Bond stress (MPa) after 24 h; HAS M12x72; Curing at 5° C. ** | 20.1 | 30.3 | 34.7 | 30.9 | 29.3 |
| Bond stress (MPa) after 24 h; HAS M12x72; Curing at 50° C. ** | 30 | 30.5 | 28 | 29 | 30.1 |

\* Determined according to DIN 16 945
\*\* Test conducted according to the requirements of ETAG001

The gel times of the mortar compositions used according to the invention compared to the reference composition could be reduced by about half.

The mortar compositions achieved load values at +23° C. and +50° C. load values which lie within the range of the comparative composition (RE 500). At +5° C. however, significantly higher load values were achieved, suggesting a good and complete curing of the mortar compositions at +5° C.

Is thus evident from the table that the mortar compositions, which show a much shorter gel time at +25° C. due to the inventive use of the novolac amine hybrid hardener, cure faster, but nevertheless achieve bond stresses, which are comparable at medium (+23° C.) and higher temperatures (+50° C.) with those of comparative anchor (HILTI RE 500) and also exceed it in the low temperature range (+5° C.).

The invention claimed is:

1. A multicomponent mortar composition comprising a hybrid hardener which contains a mixture of
   (i) at least one amine, selected from among aliphatic, alicyclic and aromatic amines, wherein the amine on average has at least two reactive hydrogen atoms, bonded to a nitrogen atom, per molecule, as a hardener;
   (ii) a novolac resin of formula (I):

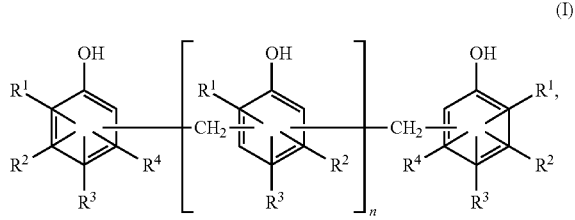

(I)

in which $R^1$, $R^2$, $R^3$ and $R^4$, each independent of each other, are hydrogen or an unbranched or branched $C_1$-$C_{15}$ alkyl radical and n is 1 to 12, wherein the novolac resin is contained in a quantity of 30 to 45 percent by weight, relative to the total weight of the hybrid hardener (i) and (ii), as a catalyst; and
   (iii) a compound of formula (II):

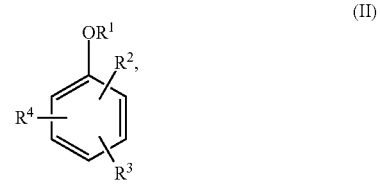

(II)

in which $R^1$ is hydrogen or an unbranched or branched $C_1$-$C_{15}$ alkyl radical, $R^2$ is a $(CH_2)_n NR^5 R^6$ radical or a $NH(CH_2)_n NR^5 R^6$ radical, in which $R^5$ and $R^6$ independently of each other are an unbranched or branched $C_1$-$C_{15}$ alkyl radical and n is 0 or 1, $R^3$ and $R^4$ independently of each other are hydrogen or a $(CH_2)_n NR^7 R^8$ radical or a $NH(CH_2)_n NR^7 R^8$ radical, and $R^7$ and $R^8$ independently of each other are an unbranched or branched $C_1$-$C_{15}$ alkyl radical and n is 0 or 1,
   wherein the multicomponent mortar composition is epoxide-based, and
   wherein the multicomponent mortar composition chemically fastens structural elements and anchoring means.

2. The multicomponent mortar composition according to claim 1, wherein in formula (I), $R^1$ to $R^4$ are hydrogen, or one or two of the radicals $R^1$ to $R^4$ are $CH_3$ radicals, or one of the radicals $R^1$ to $R^4$ is a tert-butyl radical or an unbranched or branched $C_8$-$C_{15}$ alkyl radical.

3. The multicomponent mortar composition according to claim 1, wherein the hardener contains a mixture of at least two amines, selected from among aliphatic, alicyclic and aromatic amines.

4. The multicomponent mortar composition according to claim 3, wherein the mixture contains
   (i) alkyl diamine and aromatic amines or
   (ii) alkyl diamines, polyalkylene-polyamine and aromatic amines.

5. The multicomponent mortar composition according to claim 4, wherein the mixture contains
   (i) 2-methyl-1,5-pentanediamine and 1,3-benzenedimethanamine or
   (ii) trimethylhexamethylenediamine, 2-methyl-pentanediamine, triethylenetetramine and 1,3-benzenedimethanamine.

6. The multicomponent mortar composition according to claim 5, wherein the mixture contains
   (i) 28 to 34 percent by weight 2-methyl-1,5-pentanediamine and 4 to 7 percent by weight 1,3-benzenedimethanamine, or
   (ii) 20 to 28 percent by weight trimethylhexamethylenediamine, 20 to 28 percent by weight 2-methyl-pentanediamine, 10 to 18 percent by weight triethylenetetramine and 4 to 10 percent by weight 1,3-benzenedimethanamine,
   each relative to the hybrid hardener (a) and (b).

7. The multicomponent mortar composition according to claim 1, wherein in formula (II), $R^1$ is hydrogen, $R^2$, $R^3$ and $R^4$ are each a $(CH_2)_n NR^7 R^8$ radical with n =0 or 1, and $R^7$ and $R^8$ are methyl or ethyl.

8. The multicomponent mortar composition according to claim 7, wherein the compound of the formula (II) is tris-2,4,6-(dimethylaminomethyl)phenol.

\* \* \* \* \*